(12) United States Patent
Hagiwara

(10) Patent No.: US 11,988,285 B2
(45) Date of Patent: May 21, 2024

(54) SEALING DEVICE AND SEALING STRUCTURE

(71) Applicant: NOK CORPORATION, Tokyo (JP)

(72) Inventor: Naoki Hagiwara, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 132 days.

(21) Appl. No.: 17/289,847

(22) PCT Filed: Dec. 18, 2019

(86) PCT No.: PCT/JP2019/049610
§ 371 (c)(1),
(2) Date: Apr. 29, 2021

(87) PCT Pub. No.: WO2020/153056
PCT Pub. Date: Jul. 30, 2020

(65) Prior Publication Data
US 2021/0404556 A1  Dec. 30, 2021

(30) Foreign Application Priority Data

Jan. 23, 2019  (JP) ................................. 2019-009634

(51) Int. Cl.
*F16J 15/12*  (2006.01)
*F16J 15/10*  (2006.01)

(52) U.S. Cl.
CPC ............ *F16J 15/125* (2013.01); *F16J 15/104* (2013.01)

(58) Field of Classification Search
CPC ................................ F16J 15/104; F16J 15/125
See application file for complete search history.

(56) References Cited

U.S. PATENT DOCUMENTS 4,055,352 A * 10/1977 Allinquant .............. F16F 9/364
277/575
8,691,358 B2    4/2014 Kritzer et al.
(Continued)

FOREIGN PATENT DOCUMENTS

CN    101952838    1/2011
CN    102047273    5/2011
(Continued)

OTHER PUBLICATIONS

English Translation of International Preliminary Report on Patentability, including Translation of the Written Opinion, received in PCT/JP2019/049610, dated Jul. 27, 2021.
(Continued)

*Primary Examiner* — Eugene G Byrd
(74) *Attorney, Agent, or Firm* — GREENBLUM & BERNSTEIN, P.L.C.

(57) ABSTRACT

A sealing device includes a reinforcing ring and an elastic body part formed from an elastic body and attached to the reinforcing ring. The elastic body part includes a seal lip projecting toward one side in a direction of an axis, a secondary lip portion projecting toward another side in the direction of the axis, and an outer peripheral portion covering the reinforcing ring from an outer periphery side. The seal lip projects beyond the reinforcing ring toward the one side, and the secondary lip portion projects beyond the reinforcing ring toward the other side. In the outer peripheral portion, at least one identification part acting as a mark is formed further on the one side or the other side than a middle of the outer peripheral portion.

7 Claims, 9 Drawing Sheets

(56) References Cited

U.S. PATENT DOCUMENTS

| | | | | |
|---|---|---|---|---|
| 2009/0032366 A1* | 2/2009 | Goto | ............... | F16D 25/12 |
| | | | | 192/85.44 |
| 2009/0102142 A1 | 4/2009 | Tanaka et al. | | |
| 2010/0330349 A1 | 12/2010 | Ewald et al. | | |
| 2011/0059297 A1 | 3/2011 | Kritzer et al. | | |
| 2017/0089465 A1 | 3/2017 | Yanagi | | |
| 2017/0321831 A1* | 11/2017 | Nahrwold | ............... | F16L 23/18 |
| 2018/0340620 A1* | 11/2018 | Wicher | ............... | F16K 27/067 |
| 2019/0032783 A1 | 1/2019 | Yanagi et al. | | |
| 2020/0191273 A1 | 6/2020 | Yanagi | | |
| 2021/0172524 A1* | 6/2021 | Hagiwara | ............... | F16J 15/062 |

FOREIGN PATENT DOCUMENTS

| | | |
|---|---|---|
| CN | 204004152 | 12/2014 |
| CN | 204942530 | 1/2016 |
| CN | 106133413 | 11/2016 |
| CN | 106870732 | 6/2017 |
| CN | 208221320 | 12/2018 |
| CN | 208393311 | 1/2019 |
| EP | 3412941 A1 | 12/2018 |
| JP | H6-32834 U | 4/1994 |
| JP | 10-26228 A | 1/1998 |
| JP | 2000-46186 A | 2/2000 |
| JP | 2009-74642 | 4/2009 |
| JP | 2012067790 A * | 4/2012 |
| JP | 3192593 U | 7/2014 |
| TW | 200706782 | 2/2007 |
| WO | WO 2015/137491 A1 | 9/2015 |
| WO | 2018/193766 A1 | 10/2018 |

OTHER PUBLICATIONS

Japan Official Action received in JP Application No. 2020-567428, dated Sep. 6, 2021 and English language translation thereof.
Communication pursuant to Rule 164(1) EPC issued in European application No. 19911096.6, dated Sep. 21, 2022.
ISR for PCT/JP2019/049610, dated Feb. 10, 2020.
China Office Action received in CN application No. 201980070270.0, dated Dec. 2, 2022.
Extended European Search Report received in EP application No. 19911096.6, dated Dec. 22, 2022.
Indonesia Office Action received in ID application No. P00202103145, dated Jan. 2, 2023.
China Office Action in the corresponding CN application No. 201980070270.0, dated May 26, 2023.
China Office Action received in CN application No. 201980070270.0, dated Aug. 2, 2023.
China Office Action issued in CN Application No. 201980070270.0, dated Nov. 29, 2023.

* cited by examiner

SEALING DEVICE AND SEALING STRUCTURE

CROSS REFERENCE TO RELATED APPLICATIONS

The present application is a national stage application of International Patent Application No. PCT/JP2019/049610 filed on Dec. 18, 2019, which claims the benefit of Japanese Patent Application No. 2019-009634, filed on Jan. 23, 2019. The contents of these applications are incorporated herein by reference in their entirety.

The present disclosure relates to a sealing device and a sealing structure, and particularly relates to a sealing device for static sealing and to a sealing structure including a sealing device for static sealing.

BACKGROUND ART

Conventionally, it is known that a gasket acts as a sealing device that is attached to an annular space such as an annular groove formed between a plurality of members placed face-to-face and immobilized relative to each other, such as a housing and a cover, to seal a gap between the members. The gasket and a component to which the gasket is applied forming the annular space to which the gasket is attached make up a sealing structure. Such a conventional gasket, in some cases, includes a tubular reinforcing ring formed annularly around an axis and extending in a direction of the axis and an elastic body part formed from an elastic body that is attached to the reinforcing ring. The elastic body part includes a pair of lip portions each extending along the axis from both end portions of the reinforcing ring in the direction of the axis (for example, see Japanese Utility Model Application Publication No. H6-32834).

In recent years, in response to reductions in size or weight of a component to which the gasket is applied, a cross section of the gasket has been made smaller due to downsizing of the gasket and the component to which the gasket is applied has been developed to be made thinner or to be made of resin. The smaller cross section of the gasket and the development of the component to which the gasket is applied being made thinner or being made of resin decrease a size of the annular space to which the gasket is attached and increase a degree of relative variation in the size of the space caused by manufacturing. As a result, it is conceivable that a gasket cannot provide intended sealing performance because of the variation in the size of the annular space to which the gasket is attached and thus various devices have been made (for example, see International Publication No. WO 2015/137491).

SUMMARY OF DISCLOSURE

Technical Problem

Even a gasket that can prevent a decrease in sealing performance even despite, as described above, a variation in the size of the annular space in the component to which the gasket is attached may be unable to display intended sealing performance due to a lip of the gasket being detached from the annular space in the component to which the gasket is attached if a direction in which the gasket is attached to the annular space in the component to which the gasket is attached in the direction of the axis is not an intended direction. This necessitates checking that the attached gasket faces in the intended direction. If the gasket does not face in the intended direction, the gasket needs to be properly reattached. This causes a decrease in production efficiency in some cases.

Consequently, the static sealing device like the conventional gasket and the sealing structure have been required to be developed into a sealing device and a sealing structure that enable proper attachment of the sealing device to be able to prevent a decrease in sealing performance even despite a variation in the size of an annular space in a component to which the sealing device is attached.

The present disclosure has been made in view of the above-described problem, it is an object of the present disclosure to provide a sealing device and a sealing structure that enable attachment of the sealing device in an intended way.

Solution to Problem

To achieve the above object, a sealing device according to the present disclosure is a sealing device for sealing an annular space formed by a plurality of members, in the sealing device including a reinforcing ring having an annular shape around an axis and an elastic body part formed from an elastic body, the elastic body part being attached to the reinforcing ring and having an annular shape around the axis, wherein the elastic body part includes a seal lip that is an annular portion projecting toward one side in a direction of the axis, a secondary lip portion that is an annular portion projecting toward another side in the direction of the axis, and an outer peripheral portion that is a portion covering the reinforcing ring from an outer periphery side; the seal lip projects beyond the reinforcing ring toward the one side in the direction of the axis; the secondary lip portion projects beyond the reinforcing ring toward the other side in the direction of the axis; and in the outer peripheral portion, at least one identification part is formed further on the one side or the other side than a middle of the outer peripheral portion in the direction of the axis, the at least one identification part acting as a mark.

In the sealing device according to one aspect of the present disclosure, the at least one identification part is a recessed part.

In the sealing device according to one aspect of the present disclosure, the at least one identification part is formed on an end portion on the one side of the outer peripheral portion.

In the sealing device according to one aspect of the present disclosure, a length of the seal lip in a direction of the projection is greater than a length of the secondary lip portion in a direction of the projection.

To achieve the above object, a sealing structure according to the present disclosure includes an attachment space that is an annular space around an axis formed by a plurality of members, and a sealing device for sealing the attachment space, wherein an engagement portion is formed between the attachment space and the sealing device; and the engagement portion includes a recessed engagement part that is a part formed in the attachment space, the recessed engagement part being recessed to an outer periphery side and a protruding engagement part that is a part formed in the sealing device so as to be housed in the recessed engagement part, the protruding engagement part projecting to the outer periphery side.

In the sealing structure according to one aspect of the present disclosure, the sealing device includes a reinforcing ring having an annular shape around an axis and an elastic body part formed from an elastic body, the elastic body part being attached to the reinforcing ring and having an annular shape around the axis; the elastic body part includes a seal lip that is an annular portion projecting toward one side in a direction of the axis and a secondary lip portion that is an annular portion projecting toward another side in the direction of the axis; the seal lip projects beyond the reinforcing ring toward the one side in the direction of the axis; the secondary lip portion projects beyond the reinforcing ring toward the other side in the direction of the axis; and the protruding engagement part is formed between the seal lip and the secondary lip portion in the direction of the axis.

In the sealing structure according to one aspect of the present disclosure, the reinforcing ring includes a flange portion in an end portion on the one side, the flange portion projecting annularly to the outer periphery side; and the sealing device protrudes to the outer peripheral side in the flange portion so that the protruding engagement part is formed.

In the sealing structure according to one aspect of the present disclosure, the attachment space has sealing surfaces that are a pair of annular surfaces placed face-to-face in the direction of the axis and an outer peripheral wall surface that is a tubular surface extending from one of the pair of the sealing surfaces along the axis; and the recessed engagement part is formed in an end portion of the outer peripheral wall surface on a side opposite to a side of the one of the sealing surfaces.

In the sealing structure according to one aspect of the present disclosure, the recessed engagement part is either of a chamfered part and a counterbored part.

Effects of Disclosure

According to the sealing device and the sealing structure according to the present disclosure, it is possible to be attached in an intended way.

DESCRIPTION OF EMBODIMENT

Hereinafter, an embodiment of the present disclosure will be described with reference to the drawings.

Figure 1:
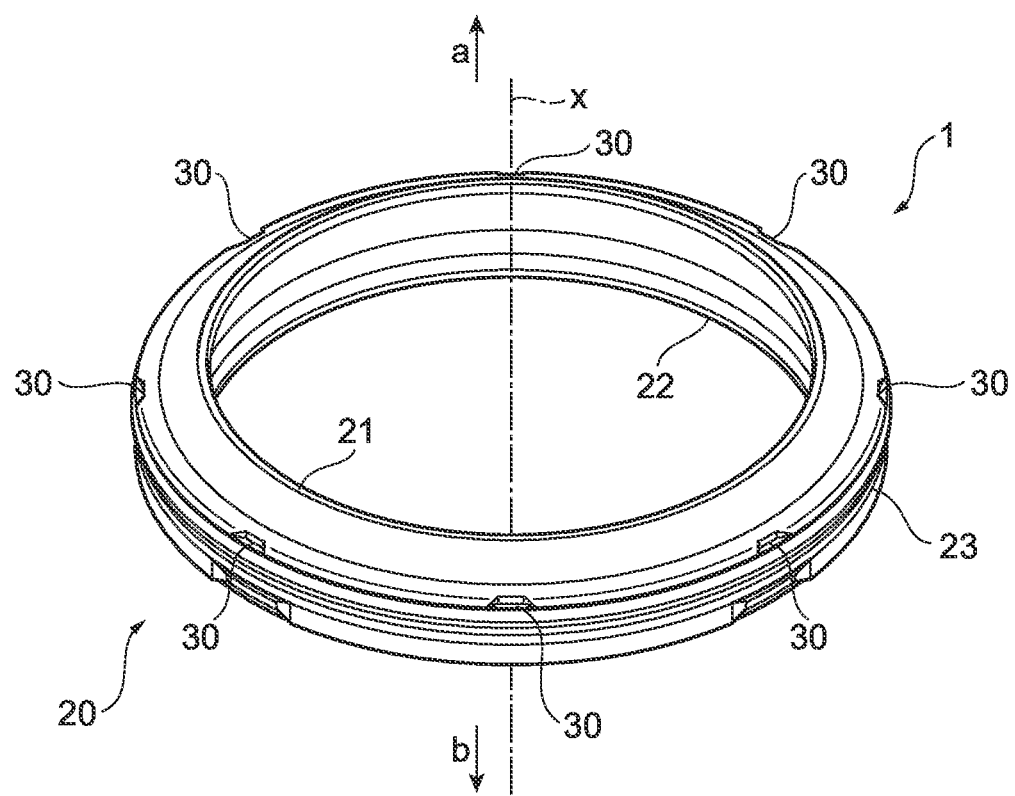
FIG. 1 A perspective view of a sealing device according to an embodiment of the present disclosure.
Figure 2:
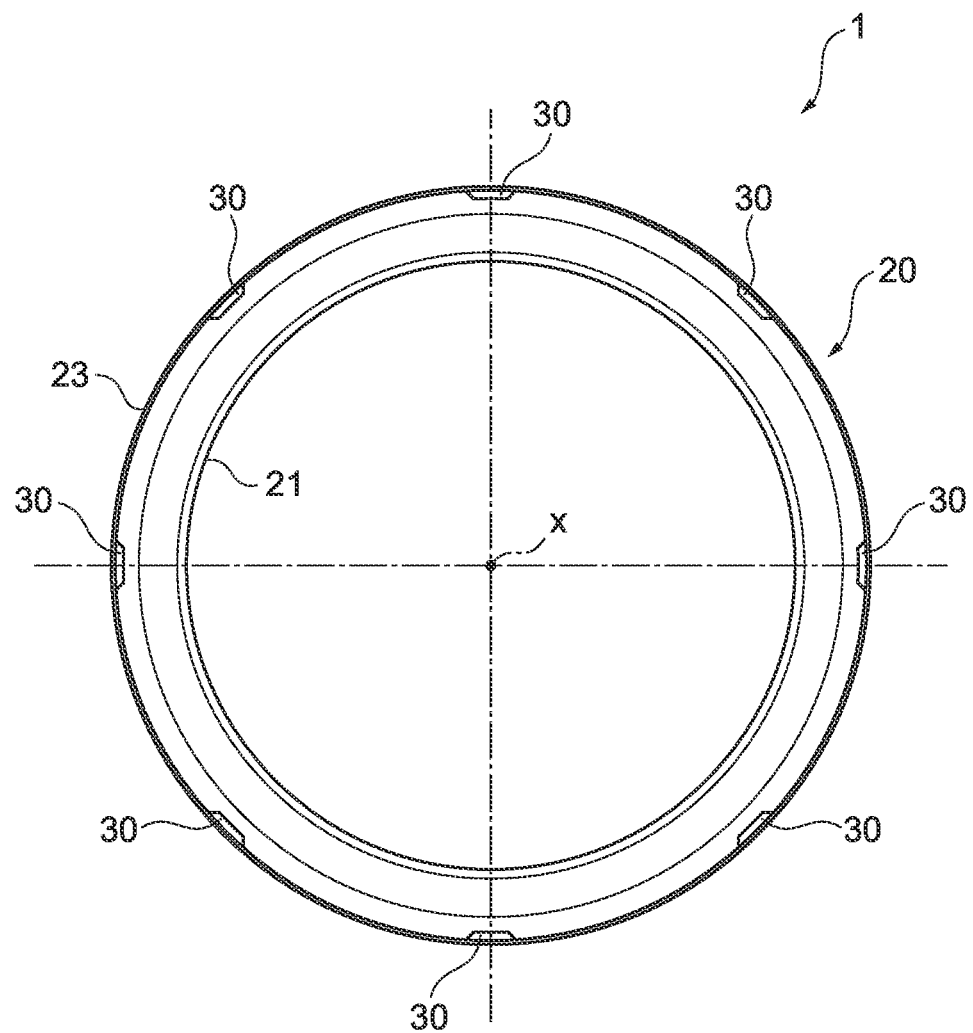
FIG. 2 A top view of the sealing device according to the embodiment of the present disclosure.
Figure 3:
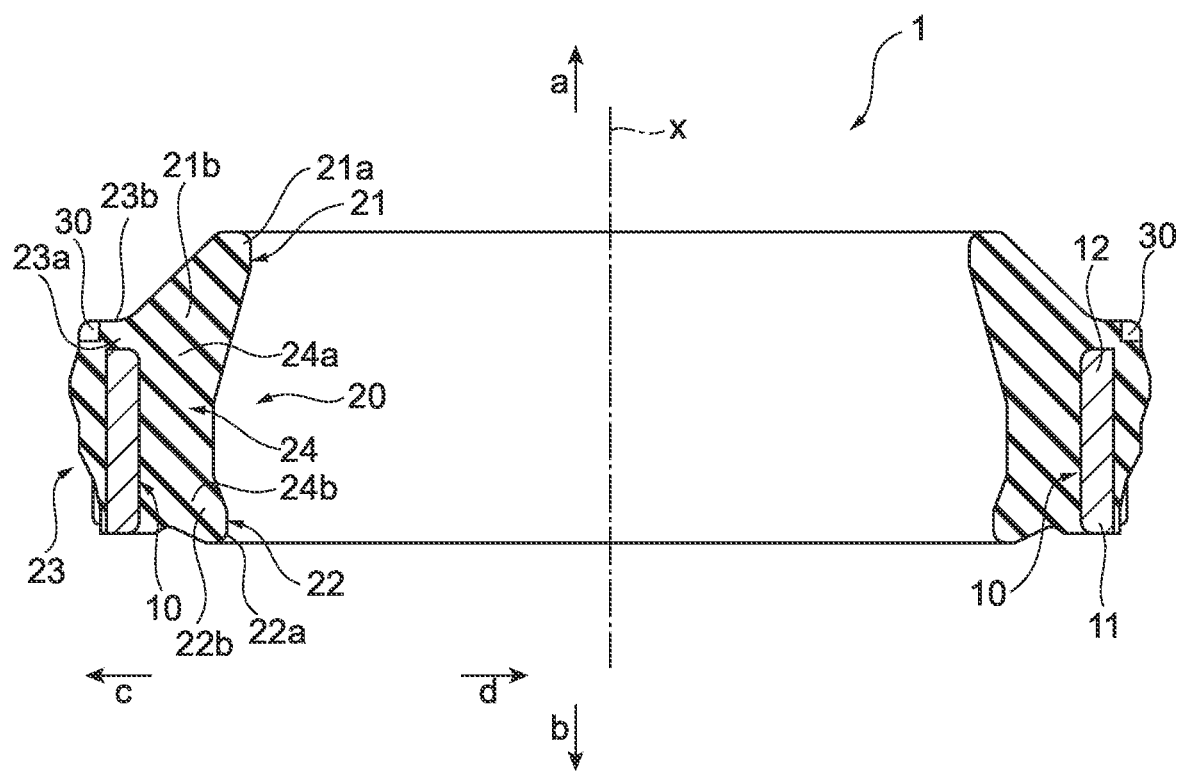
FIG. 3 A cross-sectional view of the sealing device according to the embodiment of the present disclosure in a cross section along an axis.

FIG. 1 is a perspective view of a sealing device 1 according to the embodiment of the present disclosure. FIG. 2 is a top view of the sealing device 1 according to the embodiment of the present disclosure. FIG. 3 is a cross-sectional view of the sealing device 1 according to the embodiment of the present disclosure in a cross section along an axis x. As illustrated in FIGS. 1 to 3, the sealing device 1 according to the embodiment of the present disclosure includes a reinforcing ring 10 having an annular shape around the axis x and an elastic body part 20 formed from an elastic body, the elastic body part 20 being attached to the reinforcing ring 10 and having an annular shape around the axis x. The elastic body part 20 includes a seal lip 21 that is an annular portion projecting toward one side in a direction of the axis x, a secondary lip portion 22 that is an annular portion projecting toward another side in the direction of the axis x, and an outer peripheral portion 23 that is a portion covering the reinforcing ring 10 from an outer periphery side. The seal lip 21 projects beyond the reinforcing ring 10 toward the one side in the direction of the axis x, and the secondary lip portion 22 projects beyond the reinforcing ring 10 toward the other side in the direction of the axis x. In the outer peripheral portion 23, at least one identification part 30 is formed further on the one side or the other side than a middle of the outer peripheral portion in the direction of the axis x, the at least one identification part 30 acting as a mark. The sealing device 1 is a gasket used to seal an annular space formed by a plurality of members. The annular space is, for example, formed between the members, such as a housing and a cover, placed face-to-face and immobilized relative to each other. Hereinafter, the sealing device 1 will be described in detail.

Hereinafter, a direction directed by an arrow a (see FIGS. 1 and 3) in the direction of the axis x (the one side in the direction of the axis) represents an outer side, and a direction directed by an arrow b (see FIGS. 1 and 3) in the direction of the axis x (the other side in the direction of the axis) represents an inner side, for convenience of explanation. In a direction perpendicular to the axis x (hereinafter also referred to as a "radial direction"), a direction away from the axis x (a direction directed by an arrow c in FIG. 3) represents the outer periphery side, and a direction approaching the axis x (a direction directed by an arrow d in FIG. 3) represents an inner periphery side.

As illustrated in FIG. 3, the reinforcing ring 10 is a tubular member extending along the axis x and is, for example, a cylindrical or substantially cylindrical member centered about or substantially centered about the axis x. The reinforcing ring 10 has an inner side end 11 which is an end portion on the inner side and an outer side end 12 which is an end portion on the outer side. The reinforcing ring 10 is a part for reinforcing the elastic body part 20. The reinforcing ring 10 is, for example, made of a metal material, the metal material is, for example, stainless steel or SPCC (a cold rolled steel sheet). If the reinforcing ring 10 is made of a resin material, the resin material is, for example, nylon 66 (PA66) or a polyphenylene sulfide (PPS) resin.

The elastic body part 20 is formed so as to cover the reinforcing ring 10 and includes, as described above, the seal lip 21, the secondary lip portion 22, and the outer peripheral portion 23. The elastic body part 20 also includes a base portion 24 that is a portion on the inner periphery side. The base portion 24, as illustrated in FIG. 3, is a portion covering the reinforcing ring 10 from the inner periphery side. The seal lip 21 and the secondary lip portion 22 each extend from the base portion 24. Specifically, the seal lip 21 extends from an end portion (an outer side end 24a) on the outer side of the base portion 24, whereas the secondary lip portion 22 extends from an end portion (an inner side end 24b) on the inner side of the base portion 24.

The seal lip 21, as illustrated in FIG. 3, projects diagonally from the outer side end 24a of the base portion 24 toward the outer side (the arrow a direction) and the inner periphery side (the arrow d direction). The seal lip 21 is, for example, a portion that decreases in diameter toward the outer side in the direction of the axis x and is a conical cylindrical or substantially conical cylindrical portion centered about or substantially centered about the axis x. The seal lip 21 projects further to the outer side than the outer side end 12 of the reinforcing ring 10, and a distal end 21a that is an end portion on the outer side of the seal lip 21 is positioned further on the outer side than the outer side end 12 of the reinforcing ring 10 in the direction of the axis x. Of the seal lip 21, the distal end 21a is thinner than a root 21b that is a portion joined to the base portion 24. The seal lip 21, for example, decreases in thickness from the root 21b toward the distal end 21a. The seal lip 21 has a length so as to be in contact with a sealing surface on the outer side with a predetermined interference in a usage state described later. Note that the length of the seal lip 21 is a width in a direction of extension (projection) of the seal lip 21.

As illustrated in FIG. 3, the secondary lip portion 22, for example, projects diagonally from the inner side end 24b of the base portion 24 toward the inner side (the arrow b direction) and the inner periphery side (the arrow d direction). Specifically, the secondary lip portion 22 is a portion that decreases in diameter toward the inner side in the direction of the axis x and is a conical cylindrical or substantially conical cylindrical portion centered about or substantially centered about the axis x. The secondary lip portion 22 projects further to the inner side than the inner side end 11 of the reinforcing ring 10, and a distal end 22a that is an end portion on the inner side of the secondary lip portion 22 is positioned further on the inner side than the inner side end 11 of the reinforcing ring 10 in the direction of the axis x. Of the secondary lip portion 22, the distal end 22a is thinner than a root 22b that is a portion joined to the base portion 24. The secondary lip portion 22, for example, decreases in thickness from the root 22b toward the distal end 22a. The secondary lip portion 22 has a length so as to be in contact with a sealing surface on the inner side with a predetermined interference.

The secondary lip portion 22 may be an annular protruding part projecting from the inner side end 24a of the base portion 24 to the inner side. Specifically, the secondary lip portion 22 is a circular ring shaped or substantially circular ring shaped protruding part centered about or substantially centered about the axis x. In this case as well, the secondary lip portion 22 projects further to the inner side than the inner side end 11 of the reinforcing ring 10, and the distal end 22a that is an end portion on the inner side of the secondary lip portion 22 is positioned further on the inner side than the inner side end 11 of the reinforcing ring 10 in the direction of the axis x. The secondary lip portion 22 is formed so as to be in contact with the sealing surface on the inner side with a predetermined crush allowance in the usage state described later.

As illustrated in FIG. 3, the outer peripheral portion 23 is a portion covering the reinforcing ring 10 from the outer periphery side, and the outer peripheral portion 23 is joined to the seal lip 21 in an outer side end 23a that is an end portion on the outer side. The outer peripheral portion 23, in the outer side end 23a, has a shoulder 23b where an edge (a corner) is formed on the outer periphery side. The shoulder 23 is a portion defined by an annular surface facing the outer side and a tubular surface facing the outer periphery side.

As illustrated in FIG. 3, the elastic body part 20 does not cover the inner side end 11 of the reinforcing ring 10. The elastic body part 20 may be flush with or may not be flush with the inner side end 11 of the reinforcing ring 10 in the radial direction. The elastic body part 20 may cover the inner side end 11 of the reinforcing ring 10. In this case, the elastic body part 20 is formed such that the distal end 22a of the secondary lip portion 22 is positioned further on the inner side than a part of the elastic body part 20 covering the inner side end 11 of the reinforcing ring 10 in the direction of the axis x.

The identification part 30 is a part that enables identification of an orientation of the sealing device 1 and is a part designed to ensure that a direction in which the sealing device 1 is attached to an attachment space is an intended proper direction by allowing a worker to certainly know the orientation of the sealing device 1 when the worker attaches the sealing device 1 to the attachment space to put the sealing device 1 in the usage state described later. Specifically, the identification part 30 is a part that makes it possible to identify on which side in the direction of the axis x the seal lip 21 is present in the sealing device 1. The identification part 30 is, for example, formed in the outer peripheral portion 23 of the elastic body part 20 and is formed further on an side of the seal lip 21 than the middle of the outer peripheral portion 23 in the direction of the axis x. The identification part 30 is, for example, formed in the end portion (the outer side end 23a) on the outer side (the one side) of the outer peripheral portion 23, and specifically, the identification part 30 is, as illustrated in FIG. 3, formed in the shoulder 23b of the outer peripheral portion 23. The identification part 30 is a recessed part that is recessed inward from a surface of the shoulder 23b. The identification part 30 allows the worker to identify presence of the seal lip 21 in the vicinity of the identification part 30 and properly attach the sealing device 1 to the attachment space. In the present embodiment, as illustrated in FIG. 3, a plurality of the identification parts 30 are provided and the identification parts 30 are formed at equal angle intervals around the axis x.

The identification part 30 may be formed in an area further on a side of the secondary lip portion 22 than the middle of the outer peripheral portion 23 in the direction of the axis x. In this case as well, the identification part 30 allows the worker to identify presence of the secondary lip portion 22 in the vicinity of the identification part 30 and properly attach the sealing device 1 to the attachment space. In the present embodiment, as illustrated in FIGS. 1 and 2, eight identification parts 30 are provided. However, the number of the identification parts 30 should not be limited to this example. In the sealing device 1, only one identification part 30 may be formed. The identification parts 30 may not be provided at equal angle intervals around the axis x. The identification part 30 may not be a recessed part that is recessed from the surface of the outer peripheral portion 23 but may have another identifiable shape such as a protruding part projecting from the surface of the outer peripheral portion 23, for example. However, the shape of the identification part 30 does not have an influence on sealing performance of the sealing device 1.

Examples of the elastic body of the elastic body part 20 include various rubber materials. The various rubber materials are, for example, synthetic rubber such as nitrile rubber (NBR), hydrogenated nitrile rubber (H-NBR), acrylic rubber (ACM), and fluororubber (FKM).

The reinforcing ring 10 is manufactured by press working or forging, for example, and the elastic body part 20 is molded with a mold by cross-linking (vulcanization). During the cross-linking, the reinforcing ring 10 is placed in the mold, the elastic body part 20 is bonded to the reinforcing ring 10 by cross-linking bonding, and the elastic body part 20 is integrally molded with the reinforcing ring 10.

Figure 4:
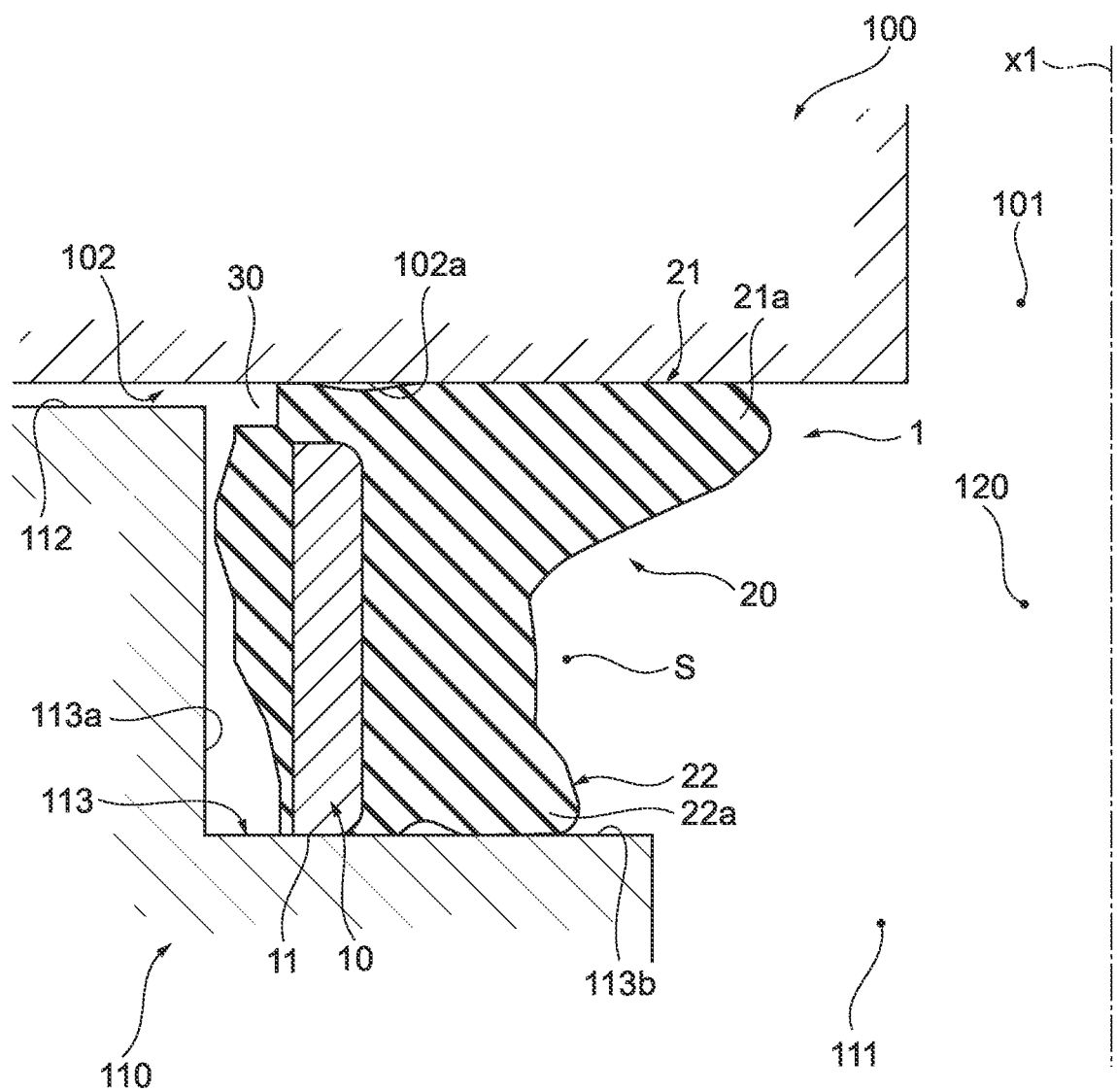
FIG. 4 A cross-sectional view of the sealing device according to the embodiment of the present disclosure in a usage state.

Next, the above described sealing device 1 in the usage state will be described. FIG. 4 is a cross-sectional view illustrating the sealing device 1 in the usage state. As illustrated in FIG. 4, the sealing device 1 gets into the usage state when the sealing device 1 is attached to an attachment space S which is an annular space. The attachment space S is, for example, a circular ring shaped or substantially circular ring shaped space around an axis x1, and the attachment space S is formed by a cover 100 in which a through-hole 101 is formed and a housing 110 to which the cover 100 is fixed and in which a through-hole 111 is formed. In a surface 112 of the housing 110, a groove portion 113 is formed to form an annular groove around the through-hole 111. The groove portion 113 is defined by an outer peripheral wall surface 113a extending in a shape of a cylinder or a substantial cylinder in a direction of the axis x1 and an inner-side sealing surface 113b that is an annular plane extending from an end portion on the inner side of the outer peripheral wall surface 113a to the through-hole 111 toward the inner periphery side. The cover 100 is fixed to the housing 110 such that a surface 102 of the cover 100 faces the surface 112 of the housing 110. The cover 100 is fixed to the housing 110 such that the through-hole 101 of the cover 100 is coaxial or substantially coaxial with respect to the through-hole 111 of the housing 110. The through-hole 101 and the through-hole 111 communicate to form a single through-tube 120. In the surface 102 of the cover 100, an annular plane that faces the inner-side sealing surface 113b of the housing 110 in the direction of the axis x1 is an outer-side sealing surface 102a. The attachment space S is an annular space defined by the above-described outer-side sealing surface 102a, the outer peripheral wall surface 113a, and the inner-side sealing surface 113b. The sealing device 1 is attached to the attachment space S to seal the attachment space S and thus seals the through-tube 120 formed by the through-hole 101 and the through-hole 111.

In the usage state, the sealing device 1 is attached to the attachment space S coaxially or substantially coaxially with respect to the attachment space S. In other words, in the usage state, the axis x and the axis x1 coincide with or slightly diverge from each other. As illustrated in FIG. 4, the sealing device 1 is put between and compressed by the cover 100 and the housing 110 in the usage state. Specifically, the seal lip 21 is pressed by the outer-side sealing surface 102a toward the inner side, and the seal lip 21 is in contact with the outer-side sealing surface 102a with an interference of a predetermined range extending from the distal end 21a. Meanwhile, the inner side end 11 of the reinforcing ring 10 is in contact with the inner-side sealing surface 113b, and the secondary lip portion 22 is pressed to the inner-side sealing surface 113b and is in contact with the inner-side sealing surface 113b with a predetermined interference or crush allowance.

The seal lip 21 is longer than the secondary lip portion 22 and is, as illustrated in FIG. 4, allowed to be in contact with the outer-side sealing surface 102a with a relatively large interference in the usage state. As a result, even if there is a variation in a size of the attachment space S, for example, a variation in a width size (a distance between the inner- and the outer-side sealing surfaces 113b and 102a) in the direction of the axis x1, the seal lip 21 is able to offset the variation to be kept in a state of contact with the outer-side sealing surface 102a. This enables also the secondary lip portion 22 to be kept in a state of being pressed to the inner-side sealing surface 113b, and thus the secondary lip portion 22 is able to be kept in a state of contact with the inner-side sealing surface 113b.

In this way, when the sealing device 1 is attached to the attachment space S in an intended direction, the sealing device 1 is able to seal the attachment space S and properly seal the attachment space S even with a variation in the size of the attachment space S.

Meanwhile, if the sealing device 1 is not attached to the attachment space S in an intended way, for example, when the sealing device 1 is attached to the attachment space S in a opposite direction in the direction of the axis x1, the seal lip 21 is pressed to the inner-side sealing surface 113b and the secondary lip portion 22 is pressed to the outer-side sealing surface 102a. As illustrated in FIG. 4, an inside diameter of the inner-side sealing surface 113b is larger than an inside diameter of the outer-side sealing surface 102a and a width of the inner-side sealing surface 113b extending in an inner peripheral direction is smaller than a width of the outer-side sealing surface 102a extending in the inner peripheral direction in some cases. In such a case, when the sealing device 1 is attached to the attachment space S in a direction opposite the intended direction in the direction of the axis x1, a part of the seal lip 21 on a side of the distal end 21a sticks out of the inner-side sealing surface 113b, causing a decrease in sealing performance or damage to the seal lip 21.

By contrast, the sealing device 1, as described above, has the identification part 30 and allows the worker to identify a side of the sealing device 1 in the direction of the axis, where the seal lip 21 is present. This can prevent the sealing device 1 from being attached to the attachment space S in a direction other than the intended direction.

Thus, the sealing device 1 according to the embodiment of the present disclosure is allowed to be attached in an intended way.

Figure 5:
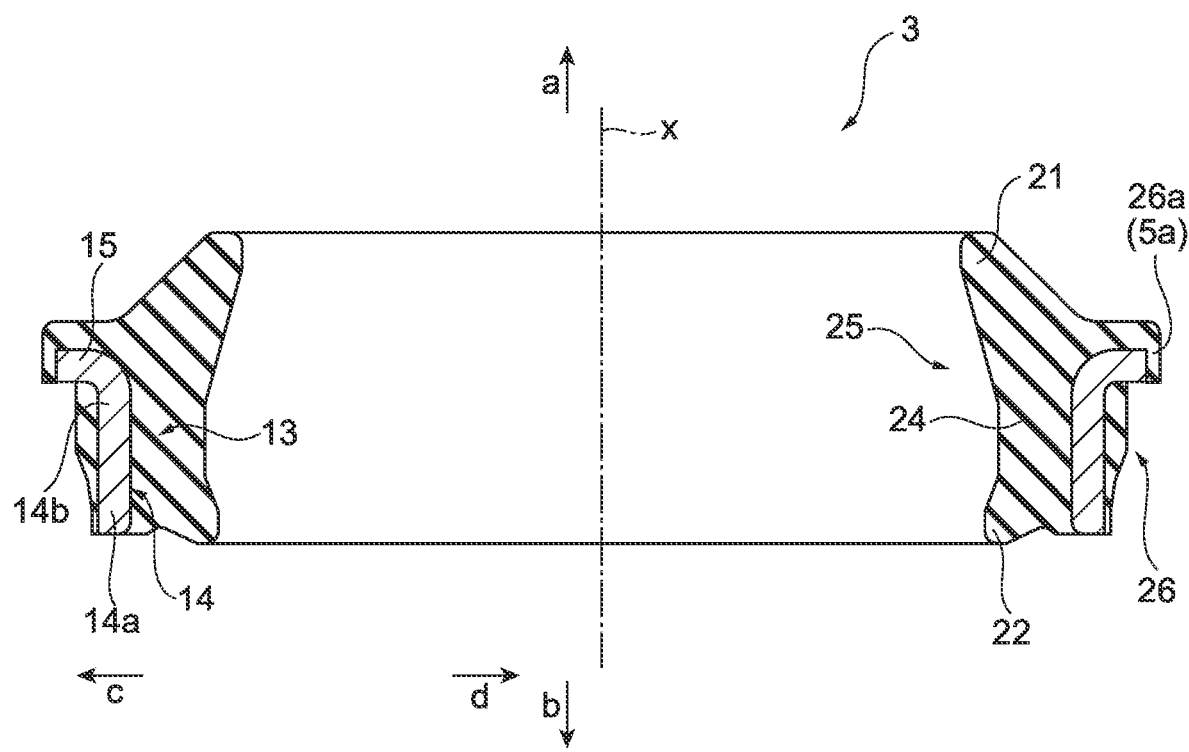
FIG. 5 A cross-sectional view of a sealing device included in a sealing structure according to an embodiment of the present disclosure in a cross section along an axis.
Figure 6:
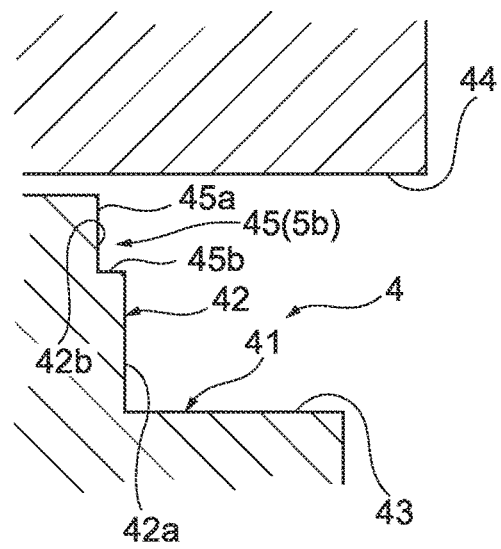
FIG. 6 A cross-sectional view of an attachment space included in the sealing structure according to the embodiment of the present disclosure in a cross section along the axis.
Figure 6:
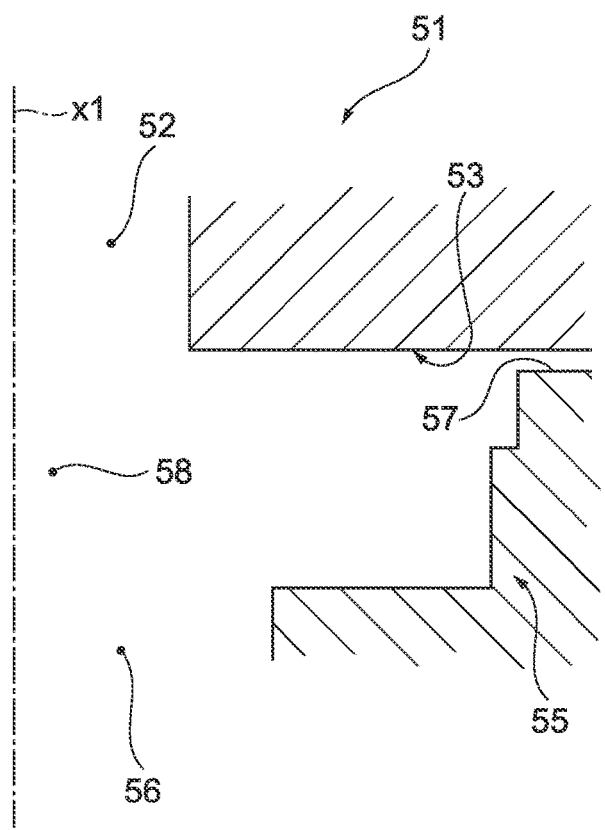
Figure 7:
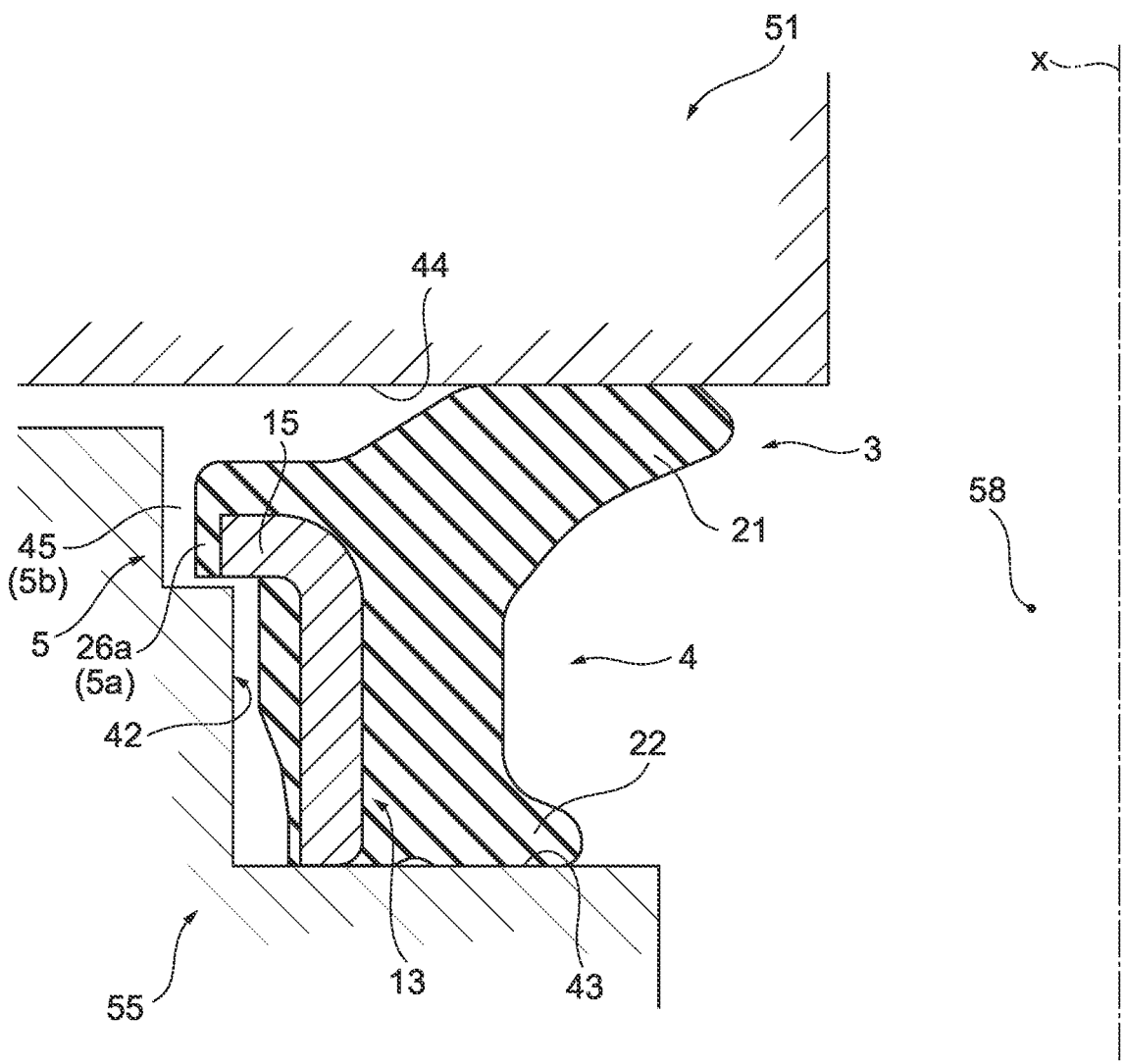
FIG. 7 A cross-sectional view of the sealing structure according to the embodiment of the present disclosure in a usage state in which the sealing device illustrated in FIG. 5 is attached to the attachment space illustrated in FIG. 6 in a cross section along the axis.

Next, a sealing structure 2 according to an embodiment of the present disclosure will be described. FIG. 5 is a cross-sectional view of a sealing device 3 included in the sealing structure 2 according to the embodiment of the present disclosure in a cross section along the axis x. FIG. 6 is a cross-sectional view of an attachment space 4 included in the sealing structure 2 according to the embodiment of the present disclosure in a cross section along the axis x. FIG. 7 is a cross-sectional view of the sealing structure 2 according to the embodiment of the present disclosure in a usage state in which the sealing device 3 is attached to the attachment space 4.

As illustrated in FIGS. 5 to 7, the sealing structure 2 includes the attachment space 4 that is an annular space around the axis x formed by a plurality of members and the sealing device 3 for sealing the attachment space 4. In the sealing structure 2, an engagement portion 5 is provided between the attachment space 4 and the sealing device 3. The engagement portion 5 includes a recessed engagement part 5b that is a part formed in the attachment space 4 and recessed to the outer periphery side and an engagement part 5a that is a part formed in the sealing device 3 and projecting to the outer periphery side so as to be housed in the recessed engagement part 5b. Hereinafter, the sealing structure 2 will be described in detail.

The sealing device 3 included in the sealing structure 2 differs from the sealing device 1 described above in forms of the reinforcing ring and the outer peripheral portion of the elastic body part. The sealing device 3 includes a reinforcing ring 13 different from the reinforcing ring 10 of the sealing device 1 and an elastic body part 25 different from the elastic body part 20 of the sealing device 1. Hereinafter, components of the sealing device 3 that are identical or similar in function to those of the sealing device 1 are assigned the same reference signs, and descriptions thereof are omitted. Components that differ between the sealing devices will be described.

As illustrated in FIG. 5, the sealing device 3 includes the reinforcing ring 13 and the elastic body part 25 that is formed from an elastic body and formed so as to cover the reinforcing ring 13. The sealing device 3 also includes the protruding engagement part 5a projecting to the outer periphery side.

As illustrated in FIG. 5, the reinforcing ring 13 includes a tubular portion 14 and a flange portion 15 on an end portion on the outer side (the one side) of the reinforcing ring 13. The tubular portion 14 is a tubular member extending along the axis x and is, for example, a cylindrical or substantially cylindrical member centered about or substantially centered about the axis x. The tubular portion 14 has an inner side end 14a which is an end portion on the inner side and an outer side end 14b which is an end portion on the outer side. The flange portion 15 is a portion projecting annularly to the outer periphery side from the outer end portion 14b of the tubular portion 14. The reinforcing ring 13 is a part for reinforcing the elastic body part 25 and is, for example, made of a metal or resin material in a similar way to the reinforcing ring 10.

As illustrated in FIG. 5, the elastic body part 25 includes a seal lip 21 and a secondary lip portion 22 each projecting from a base portion 24 and an outer peripheral portion 26 covering the reinforcing ring 13 from the outer periphery side. In the outer peripheral portion 26, a part covering the flange portion 15 of the reinforcing ring 13 projects to the outer periphery side, the outer peripheral portion 26 has an annular projecting part 26a. In a similar way to the elastic body part 20, the elastic body part 25 is formed from a elastic body.

In the sealing device 3, the reinforcing ring 13 includes the flange portion 15 projecting to the outer periphery side, and the outer peripheral portion 26 of the elastic body part 25, in which the part covering the flange portion 15 projects to the outer periphery side, has the projecting part 26a. In this way, in the sealing device 3, the outer peripheral portion 26 projects to the outer periphery side (the projecting part 26a) in the flange portion 15, and the protruding engagement part 5a is formed by the flange portion 15 and the projecting part 26a.

Note that the flange portion 15 may be made up of a plurality of arcs formed at intervals between the arcs in an intermittently annular shape rather than an endless annular shape as described above. Alternatively, the flange portion 15 may be a single arc extending in a circumference around the axis x. In this case, the projecting part 26a also has a shape corresponding to that of the flange portion 15 and thus the protruding engagement part 5a has a shape corresponding to that of the flange portion 15.

As illustrated in FIG. 6, the attachment space 4 is an annular space formed in a component to which the sealing device 3 is attached. The attachment space 4 is, for example, a circular ring shaped or substantially circular ring shaped space around the axis x formed by a cover 51 in which a through-hole 52 is formed and a housing 55 to which the cover 51 is fixed and in which a through-hole 56 is formed. In a surface 57 of the housing 55, a groove portion 41 is formed to form an annular groove around the through-hole 56. The groove portion 41 is defined by an outer peripheral wall surface 42 extending in a shape of a cylinder or a substantial cylinder in a direction of the axis x and an inner-side sealing surface 43 that is an annular plane extending from an end portion (an inner side end 42a) on the inner side of the outer peripheral wall surface 42 to the through-hole 56 toward the inner periphery side. The cover 51 is fixed to the housing 55 such that a surface 53 of the cover 51 faces the surface 57 of the housing 55. The cover 51 is fixed to the housing 55 such that the through-hole 52 of the cover 51 is coaxial or substantially coaxial with respect to the through-hole 56 of the housing 55. The through-hole 52 and the through-hole 56 communicate to form a single through-tube 58. In the surface 53 of the cover 51, an annular plane that faces the inner-side sealing surface 43 of the housing 55 in the direction of the axis x is an outer-side sealing surface 44.

The attachment space 4 is an annular space defined by the above-described outer-side sealing surface 44, the outer peripheral wall surface 42, and the inner-side sealing surface 43. As illustrated in FIG. 6, the outer peripheral wall surface 42 of the attachment space 4 has a counterbored part 45 that is recessed in a shape of a counterbore toward the outer periphery side. The counterbored part 45 is formed in an end portion (an outer side end 42b) on the outer side of the outer peripheral wall surface 42 opposite the end portion (the inner side end 42a) on a side of the inner-side sealing surface 43. Specifically, the counterbored part 45 is defined by a tubular surface 45a that is a tubular surface extending along the axis x and an annular surface 45b that is an annular surface extending from an end portion on the inner side of the tubular surface 45a toward the inner periphery. In the sealing structure 2 in a usage state described later, the counterbored part 45 is formed so as to house the protruding engagement part 5a of the sealing device 3. Thus, in the attachment space 4, the counterbored part 45 forms the recessed engagement part 5b.

In the usage state of the sealing structure 2, the sealing device 3 is attached to the attachment space 4 to seal the attachment space 4 in a similar way to the sealing device 1 described above. In other words, the seal lip 21 and the secondary lip portion 22 of the sealing device 3 are in contact with the outer-side sealing surface 44 and the inner-side sealing surface 43, respectively. The protruding engagement part 5a of the sealing device 3 is housed in the recessed engagement part 5b of the attachment space 4. In this way, in the sealing structure 2, when the sealing device 3 is attached to the attachment space 4 in an intended proper direction, the protruding engagement part 5a is housed in the recessed engagement part 5b. In this state, the seal lip 21 is in contact with the outer-side sealing surface 44 with a desired interference, and the secondary lip portion 22 is in contact with the inner-side sealing surface 43 with a desired interference or crush allowance. Meanwhile, in the sealing structure 2, if the sealing device 3 is to be attached in an improper direction and a direction different from the intended direction, i.e., when the sealing device 3 is to be attached to an interior of the groove portion 41 of the attachment space 4 from the seal lip 21 side, the protruding engagement part 5a is housed in the recessed engagement part 5b but the protruding engagement part 5a is caught in the recessed engagement part 5b such that the sealing device 3 is stopped from advancing into the attachment space 4 further. This can prevent the sealing device 3 from being attached to the attachment space 4 in a direction other than the intended direction.

Thus, according to the sealing structure 2 according to the embodiment of the present disclosure, it is possible to be attached in an intended way.

Figure 8:
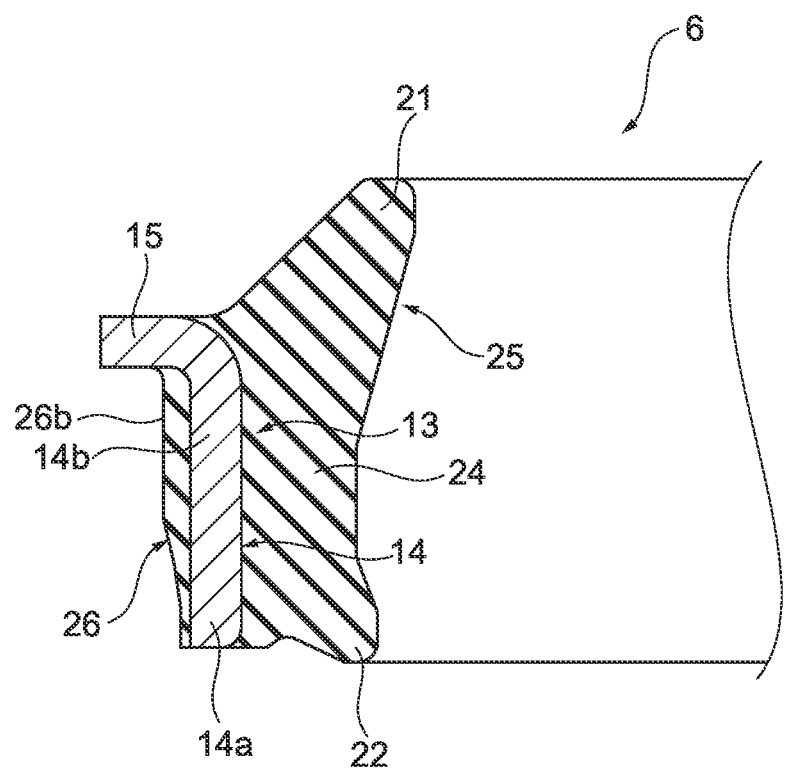
FIG. 8 A cross-sectional view of a sealing device according to a modification example of the sealing device illustrated in FIG. 5 in a cross section along the axis.

Next, a modification example of the sealing device 3 in the sealing structure 2 described above will be described. FIG. 8 is a cross-sectional view of a sealing device 6 according to a modification example of the sealing device 3 in a cross section along the axis x. The sealing device 6 according to the present modification example differs from the sealing device 3 described above in a form of the outer peripheral portion 26 of the elastic body part. In the sealing device 6 according to the modification example, an outer peripheral portion 26 of an elastic body part 25 does not cover the flange portion 15 of the reinforcing ring 13, the flange portion 15 passes through the outer peripheral portion 26 and projects from a surface 26b of the outer peripheral portion 26. In this way, the sealing device 6 does not include the projecting part 26a in the outer peripheral portion 26 of the elastic body part 25. In the sealing device 6, a protruding engagement part 5a is formed by the flange portion 15 of the reinforcing ring 13 sticking out from the outer peripheral portion 26. This protruding engagement part 5a, in a similar way to the protruding engagement part 5a described above, is designed to be capable of being housed in the recessed engagement part 5b of the attachment space 4 in the usage state of the sealing structure 2. The sealing structure 2 can prevent the sealing device 6 from being attached to the attachment space 4 in a way that differs from the intended way.

Figure 9:
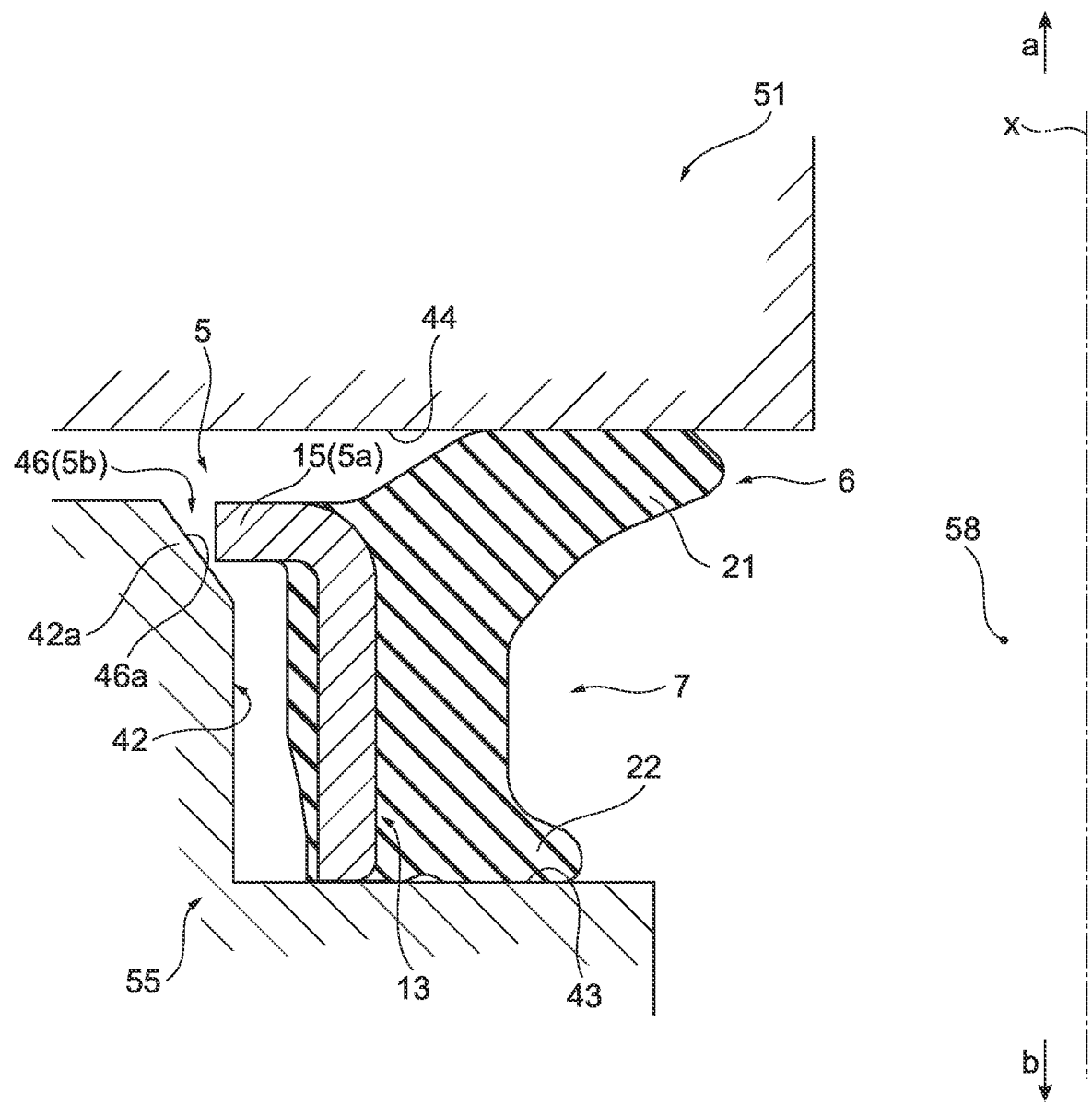
FIG. 9 A cross-sectional view of a sealing structure including an attachment space according to a modification example of the attachment space illustrated in FIG. 6 in a cross section along the axis.

Next, a modification example of the attachment space 4 in the sealing structure 2 described above will be described. FIG. 9 is a cross-sectional view of a sealing structure 2 including an attachment space 7 according to a modification example of the attachment space 4. In FIG. 9, the attachment space 7 according to the modification example is illustrated in a usage state in which the sealing device 6 described above is attached to the attachment space 7. As illustrated in FIG. 9, the attachment space 7 according to the modification example includes a chamfered part 46 recessed to the outer periphery side as a recessed engagement part 5b in place of the counterbored part 45. The chamfered part 46 is designed in such a manner that the flange portion 15 of the sealing device 6 can be housed in the chamfered part 46. Specifically, as illustrated in FIG. 9, the chamfered part 46 has a chamfered surface 46a in an outer side end 42b of an outer peripheral wall surface 42. The chamfered surface 46a is an annular surface that increases in diameter toward the outer side (the arrow a direction) in the direction of the axis x and is, for example, a conical or substantially conical surface centered or substantially centered about the axis x. The chamfered part 46 is a recessed part forming an annular space that is defined by the chamfered surface 46a, and thus the space extends further to the outer periphery side toward the outer side in the direction of the axis x. Note that the chamfered part 46 may be in any other form, and the chamfered part 46, for example, may have a portion in which the chamfered part 46 does not continuously extend to the outer periphery side toward the outer side in the direction of the axis x.

In the usage state of the sealing structure 2, in the attachment space 7 according to the modification example, the protruding engagement part 5a is, as described above, allowed to be housed in the recessed engagement part 5b. In the sealing structure 2, it is possible to prevent the sealing device 6 from being attached to the attachment space 7 in a way that differs from the intended way. Note that the attachment space 7 acts similarly for the sealing device 3, and in the sealing structure 2, it is possible to prevent the sealing device 3 from being attached to the attachment space 7 in a way that differs from the intended way.

Although the embodiments of the present disclosure has been described above, the present disclosure is not limited to the sealing device or the sealing structure according to the embodiments of the present disclosure, and includes any modes falling within the scope of the concept and claims of the present disclosure. Respective configurations may be appropriately selectively combined to solve at least part of the above-described problems and achieve at least part of the above-described effects. For example, in the above-described embodiments, the shape, material, arrangement, size and the like of each component can be appropriately changed according to a specific use mode of the present disclosure.

The invention claimed is:

1. A sealing structure comprising an attachment space that is an annular space around an axis formed by a plurality of members and a sealing device for sealing the attachment space, wherein:
   an engagement portion is formed between the attachment space and the sealing device;
   the engagement portion includes a recessed engagement part that is a part formed in the attachment space, the recessed engagement part being recessed to an outer periphery side and a protruding engagement part that is a part formed in the sealing device so as to be housed in the recessed engagement part, the protruding engagement part projecting to the outer periphery side;
   the sealing device comprises a reinforcing ring having an annular shape around the axis and an elastic body part formed from an elastic body, the elastic body part being attached to the reinforcing ring and having an annular shape around the axis;
   the elastic body part includes a seal lip that is an annular portion projecting toward one side in a direction of the axis and a secondary lip portion that is an annular portion projecting toward another side in the direction of the axis;
   the seal lip is located closer to the axis in the radial direction than the secondary lip portion; and
   the plurality of members comprises a first member and a second member,
   wherein the first member has a first surface provided at an opening end of the recessed engagement part and extending radially outward of the recessed engagement part,
   wherein the second member has a second surface facing the first surface in the direction of the axis, and
   wherein the protruding engagement part is housed in the recessed engagement part such that a terminal end of the protruding engagement part is positioned radially inwardly of an innermost position at which the first surface and the second surface oppose each other.

2. The sealing structure according to claim 1, wherein:

the seal lip projects beyond the reinforcing ring toward the one side in the direction of the axis;

the secondary lip portion projects beyond the reinforcing ring toward the other side in the direction of the axis; and the protruding engagement part is formed between the seal lip and the secondary lip portion in the direction of the axis.

3. The sealing structure according to claim 2, wherein:

the reinforcing ring includes a flange portion in an end portion on the one side, the flange portion projecting annularly to the outer periphery side; and the sealing device protrudes to the outer peripheral side in the flange portion so that the protruding engagement part is formed.

4. The sealing structure according to claim 1, wherein:

the attachment space has sealing surfaces that are a pair of annular surfaces placed face-to-face in the direction of the axis and an outer peripheral wall surface that is a tubular surface extending from one of the pair of the sealing surfaces along the axis; and the recessed engagement part is formed in an end portion of the outer peripheral wall surface on a side opposite to a side of the one of the sealing surfaces.

5. The sealing structure according to claim 4, wherein the recessed engagement part is either of a chamfered part and a counterbored part.

6. A sealing structure comprising an attachment space that is an annular space around an axis formed by a plurality of members and a sealing device for sealing the attachment space, wherein:

an engagement portion is formed between the attachment space and the sealing device;

the engagement portion includes a recessed engagement part that is a part formed in the attachment space, the recessed engagement part being recessed to an outer periphery side and a protruding engagement part that is a part formed in the sealing device so as to be housed in the recessed engagement part, the protruding engagement part projecting to the outer periphery side;

the sealing device comprises a reinforcing ring having an annular shape around the axis and an elastic body part formed from an elastic body, the elastic body part being attached to the reinforcing ring and having an annular shape around the axis;

the elastic body part includes a seal lip that is an annular portion projecting toward one side in a direction of the axis and a secondary lip portion that is an annular portion projecting toward another side in the direction of the axis;

the length of the seal lip in the axial direction is longer than the length of the secondary lip portion in the axial direction; and the plurality of members comprises a first member and a second member, wherein the first member has a first surface provided at an opening end of the recessed engagement part and extending radially outward of the recessed engagement part, wherein the second member has a second surface facing the first surface in the direction of the axis, and wherein the protruding engagement part is housed in the recessed engagement part such that a terminal end of the protruding engagement part is positioned radially inwardly of an innermost position at which the first surface and the second surface oppose each other.

7. A sealing structure comprising an attachment space that is an annular space around an axis formed by a plurality of members and a sealing device for sealing the attachment space, wherein:

an engagement portion is formed between the attachment space and the sealing device;

the engagement portion includes a recessed engagement part that is a part formed in the attachment space, the recessed engagement part being recessed to an outer periphery side and a protruding engagement part that is a part formed in the sealing device so as to be housed in the recessed engagement part, the protruding engagement part projecting to the outer periphery side;

the sealing device comprises a reinforcing ring having an annular shape around the axis and an elastic body part formed from an elastic body, the elastic body part being attached to the reinforcing ring and having an annular shape around the axis;

the elastic body part includes a seal lip that is an annular portion projecting toward one side in a direction of the axis and a secondary lip portion that is an annular portion projecting toward another side in the direction of the axis;

the seal lip is located closer to the axis in the radial direction than the secondary lip portion;

the length of the seal lip in the axial direction is longer than the length of the secondary lip portion in the axial direction; and the plurality of members comprises a first member and a second member, wherein the first member has a first surface provided at an opening end of the recessed engagement part and extending radially outward of the recessed engagement part, wherein the second member has a second surface facing the first surface in the direction of the axis, and wherein the protruding engagement part is housed in the recessed engagement part such that a terminal end of the protruding engagement part is positioned radially inwardly of an innermost position at which the first surface and the second surface oppose each other.

* * * * *